United States Patent [19]

Berghahn

[11] 4,384,916

[45] May 24, 1983

[54] APPARATUS FOR ASSEMBLING HOLLOW BALLS

[75] Inventor: Walter G. Berghahn, Scotch Plains, N.J.

[73] Assignee: Bristol-Myers Company, New York, N.Y.

[21] Appl. No.: 308,873

[22] Filed: Oct. 5, 1981

[51] Int. Cl.³ .............................................. B23P 19/02
[52] U.S. Cl. ..................................... 156/567; 29/773; 29/785; 29/787; 118/230; 118/244; 156/292; 156/308.6; 156/556; 156/578
[58] Field of Search ................. 156/292, 69, 556, 566, 156/567, 569, 578, 308.6, 293, 294; 29/773, 785, 787; 118/230, 216, 244, 320

[56] References Cited

U.S. PATENT DOCUMENTS

| | | | |
|---|---|---|---|
| 1,654,647 | 1/1928 | Heist. | |
| 1,743,884 | 1/1930 | De Witt | 118/254 |
| 1,848,382 | 3/1932 | Peters | 118/230 |
| 2,185,089 | 1/1939 | Kronquest | 118/230 |
| 2,319,683 | 5/1943 | Hofmann | 18/11 |
| 2,378,034 | 6/1945 | Perryman | 156/292 |
| 2,597,704 | 5/1952 | Carlson | 154/116 |
| 2,630,953 | 3/1953 | Kath | 29/773 |
| 2,987,812 | 6/1961 | Donaldson | 29/773 |
| 3,356,068 | 12/1967 | Fritch, Jr. et al. | 118/244 |
| 3,731,359 | 5/1973 | Glenn | 29/148.4 |
| 3,821,047 | 6/1974 | Schruff et al. | 156/69 |
| 3,873,400 | 3/1975 | Tsuschida et al. | 156/578 |
| 4,177,548 | 12/1979 | Yarick et al. | 29/773 |
| 4,247,357 | 1/1981 | Kontz | 156/567 |

Primary Examiner—Jerome W. Massie
Attorney, Agent, or Firm—Irving Holtzman; George A. Mentis

[57] ABSTRACT

A method and apparatus for assembling hollow balls from molded hemispheres which are fed to the apparatus. The hemispheres fed to the apparatus are received in a plurality of slots located about the circumference of a wheel. While the hemispheres are in the slots, an applicator disc applies a solvent to the hemispheres and pressure cams force the hemispheres together, thereby forming complete balls. The balls are then discharged from the apparatus.

The same apparatus may be used to assemble hollow balls from hemispheres which are adapted to be snapped together. In that case, no solvent is applied by the applicator disc and the pressure applied by the pressure cams is used to snap the hemispheres together into hollow balls.

11 Claims, 5 Drawing Figures

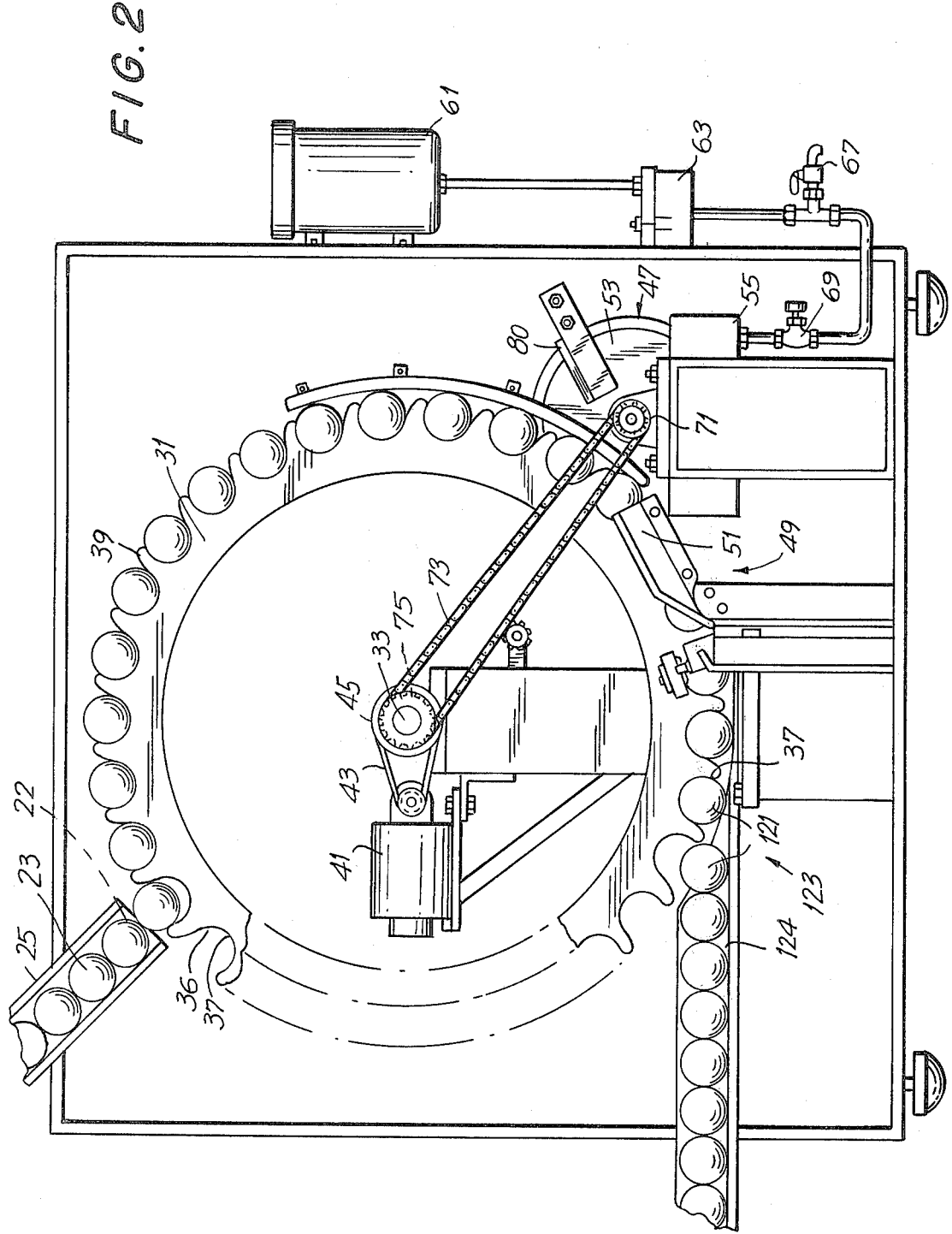

APPARATUS FOR ASSEMBLING HOLLOW BALLS

This invention relates to a method and apparatus for assembling hollow balls, and more particularly, to a method and apparatus for making dispensing balls used on roll-on cosmetics.

In a product dispensing apparatus, especially dispensing apparatus for dispensing antiperspirants in a roll-on type dispenser, it is desired to provide hollow balls. The function of the balls produced according to the preferred embodiment is to provide a rolling applicator surface. However, it is anticipated that the hollow balls will have other purposes as well.

The balls are made hollow in order to reduce the amount of plastic material needed to make such balls, and thereby to allow production of ball-type dispensers in which the ball is relatively large and, therefore, convenient and effective to use by the consumer as well as having an appearance which is pleasing to the consumer.

Several prior art techniques have been used to produce hollow balls. For example, U.S. Pat. No. 2,378,034 discloses a method in which a solvent softened material is disposed or applied to the faces of flanges of ball halves. The halves are then pressed together in order to form a single ball. This patent discloses no method of applying the solvent to the ball halves. Additionally, no method of continuously producing a series of completed balls as the ball halves are being fed from a supply means is disclosed in this patent.

U.S. Pat. No. 3,821,047 discloses a method and apparatus for solvent sealing plastic film cassette seams. The sections of the film cassette are assembled in an unspecified manner and fed into a carrier 18 in a circular disc 18 which is then delivered to a solvent spraying and sealing station. The separated sections of cassette are not carried separately on the circular disc nor are they assembled on leaving the circular disc in a manner comparable to the operating of the machine of the present invention.

U.S. Pat. No. 2,597,704 shows a process for making hollow balls whereby ball halves are brought together in an unspecified manner and the edges of each half are subjected to a heat treatment by a heated plate. The two halves thus treated are sealed by pressing the halves together in an unspecified manner.

U.S. Pat. No. 3,731,359 discloses a process and apparatus for making hollow ball bearings. In accordance with this patent, pre-formed metallic hemispheres are fed from a hopper to an electrode station wherein the hemispheres are welded together. The circular conveyer of the present invention is not part of the disclosure of this patent nor is the manner of guiding or sealing the ball halves of this invention shown.

Furthermore, where it is desired that the surface of the balls carry a fluid, it is preferred in accordance with the present invention to provide a controlled textured surface. For example, it may be desired to provide a surface roughness or a surface texture which would allow the fluid to lubricate the ball as it rolls through the dispenser while providing a frictional contact with human skin. It may also be desired to use lightweight porous materials to make the balls while maintaining a controlled surface texture. It is therefore desirable to assemble a series of hollow balls from ball halves without the use of thermal bonding techniques used in the prior art discussed above and in such a way that the outer surfaces of the balls is not significantly damged by bonding adhesive or solvent. The process of the present invention does not require heating to obtain the bonding required. This, accordingly, avoids some of the disadvantages of the aforesaid prior art processes.

The economics involved in the marketing of a roll-on dispenser that employs a ball and particularly, the marketing of an antiperspirant product of this type requires that the cost for manufacturing the ball is quite minimal. This requires that the process be one which is continuous and capable of high speed production and utilizes low cost materials. The present invention meets these criteria.

It may be decided at one time that it is most economical to produce the balls of, for example, polystyrene plastic with the ball halves being solvent bonded together. On another occasion, it may be found to be more economical to mold the ball halves from polypropylene plastic and merely force the halves to engage each other without the use of a bonding material or solvent. The process and machines of the present invention make it possible to use either procedure.

Therefore, it is an object of this invention to provide a means for assembling ball halves in a mass production manner at a reasonable cost and at high speed.

It is a further object of this invention to provide an assembly means which may be used with a plurality of different materials, and the balls assembled with or without the use of a solvent applicator.

These and other objects are achieved by providing an assembly machine wherein a plurality of ball halves are fed to the machine which receives the ball halves on a slotted wheel. The slots first guide mating ball halves past a bonding material applicator station (when desired) and then guide the halves past a pressure cam station. The pressure cam station forces the ball halves together to form hollow balls, after which the slots guide the balls to a discharge chute.

The pressure cam station first applies a light pressure to position the ball halves toward each other both while the halves are at the applicator station and just prior to being formed into hollow balls. The pressure cam station then applies an increased amount of pressure as necessary to force the halves together.

The machine may be selectively used for assembling balls in which the balls are solvent bonded together, for assembling the balls from ball halves which are force fitted together, on balls which are both force fitted together and solvent bonded, all using the same pressure cam station. Therefore, adjustment means is provided at the pressure cam station to adjust the increased amount of pressure applied.

BRIEF DESCRIPTION OF THE DRAWINGS

FIG. 2 is a side view of the apparatus according to the preferred embodiment of the invention.

The assembly machine 1 according to the preferred embodiment is used to assemble hollow balls from pairs of hemispherical halves. Referring to FIG. 1, the assembly machine 1, according to the preferred embodiment, is used in an assembly line wherein male and female ball halves are prepared by a male mold 11 and a female mold 12 respectively. The molded halves are then fed to the ball assembly machine which assemblies the ball halves into balls. The balls are then fed to a pair of grinding stations 13 for removing surface irregularities from the assembled balls as well as providing additional surface texturizing. The balls are then sent to a washing station 15 and a drying station 17 and from the drying station the balls are sent to a measuring station 19.

Referring to FIGS. 2 and 3, the male and female ball halves 22, 23 are fed to the assembly machine 1 at an entrance chute 25. The ball halves 22, 23 are guided by the entrance chute in a pair of parallel columns until they reach an assembly wheel 31.

Figure 1:
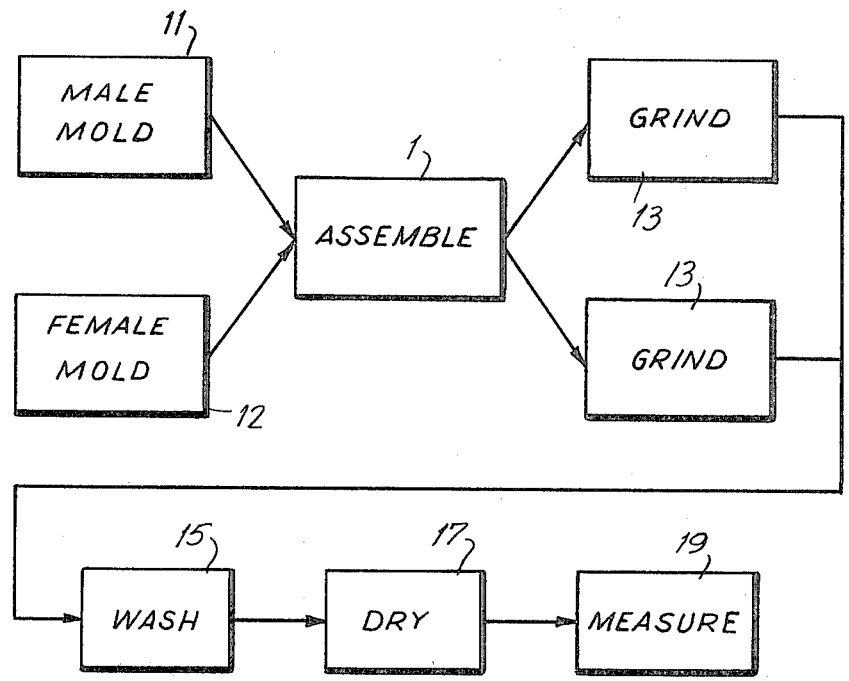
FIG. 1 is a block diagram of an assembly line using the apparatus according to the invention.

The assembly wheel 31 comprises a pair of circular discs 32 and 34 held together in a spaced relationship to provide a space 57 between them. Wheel 31 has a center axis 33 which is in a horizontal plane so that the assembly wheel 31 is aligned vertically.

The wheel has a plurality of male and female slots 36, 37 arranged about an outer portion 39 of the wheel 31. The male slots 36 are aligned with the female slots 37 parallel to the center axis 33. Each male slot 36 is adapted to receive one male ball half 22 and each female slot 37 is adapted to receive one female ball half 23. The slots 36, 37 are contoured so as to retain mating surfaces of the mating ball halves 22, 23 in separate opposed alignment with each other.

The wheel is caused to rotate about its axis by a main drive motor 41 which drives a drive chain 43 which in turn drives a first wheel pulley 45. The belt pulley is, of course, fixed to the assembly wheel 31 so that both the first wheel pulley 45 and the assembly wheel 31 rotate at the same angular speed. Therefore, as the assembly wheel is rotated, the slots 36, 37 receive successive ball halves 22, 23. The ball halves 22, 23 are rotated past a solvent applicator station 47 and then past a pressure cam station 49. However, in the preferred embodiment, the solvent applicator station 47 extends through the first part 51 of the pressure cam station 49 in order to allow the pressure cam station 49 to effect some pressure at the solvent applicator station 47.

The solvent applicator station 47 consists of an applicator disc 53 partially immersed in an applicator tank 55.

Space 57 which is provided in the assembly wheel 31 extends through the outer portion 39 of the wheel 31 towards the center axis 33 beyond the slots 36, 37. The applicator discs 53 extends into space 57 so that as the slots 36, 37 containing the ball halves 22, 23 pass the applicator disc 53, the applicator disc 53 is between the ball halves 22, 23.

The applicator tank 55 is supplied with a solvent such as methylene chloride. The solvent is gravity fed from a supply tank 61 to a float control 63 and from the float control 63 to the applicator tank 55. A drain valve 67 and a shut-off valve 69 are provided between the float control 63 and applicator tank 55 in order to facilitate shut-down of the solvent supply to the applicator tank 55. The applicator disc 53 is caused to rotate about applicator bearings 71 by a chain belt 73. The chain belt is driven by a drive sprocket 75 which is fixed to the assembly wheel 31 at the center axis thereof. Therefore, the drive sprocket 75 rotates at the same rotational speed as the assembly wheel 31 and the first wheel pulley 45. It can therefore be seen that the applicator disc 53 will rotate at a speed which is directly proportional to the rotational speed of the assembly wheel 31.

As the applicator disc 53 rotates, it is partially immersed in the applicator tank 55 which is supplied with solvent. The solvent is transferred by the disc 53 to each ball half 22, 23 at surfaces 78, 79 of the male and female balls 22, 23 respectively which contact the applicator disc 53. Wipers 80 contact the applicator disc 53 to control the amount of solvent on the applicator disc as well as prevent dissolved plastic from accumulating on the disc 53.

Figure 5:
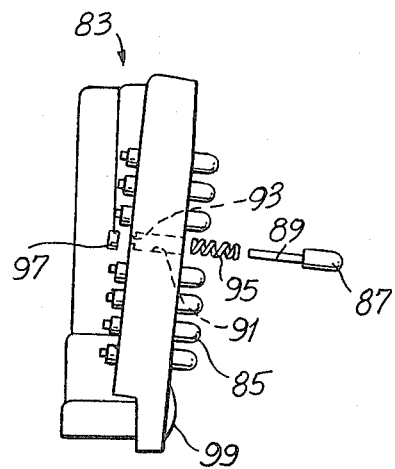
FIG. 5 is an exploded view showing the positioners in the fixed half of the cam station according to the invention, taken from the underside of FIG. 3.
Figure 3:
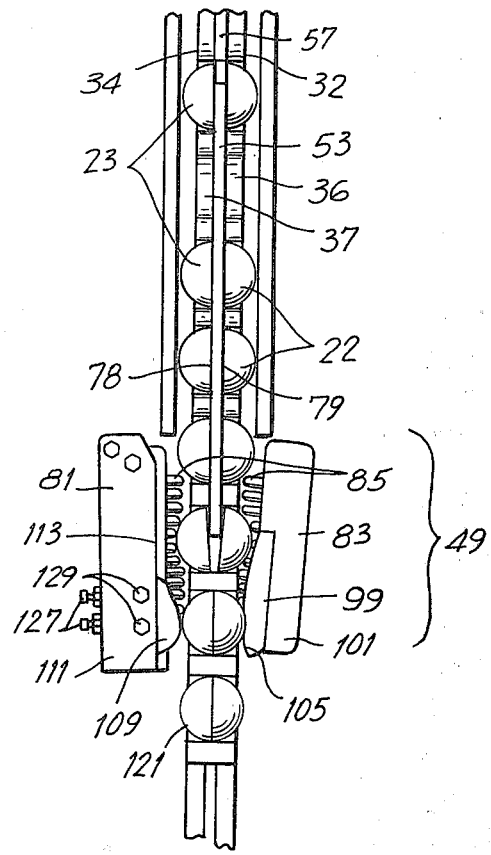
FIG. 3 is a partial end view of the preferred embodiment of the invention showing the pressure cam station and applicator disc.
Figure 4:
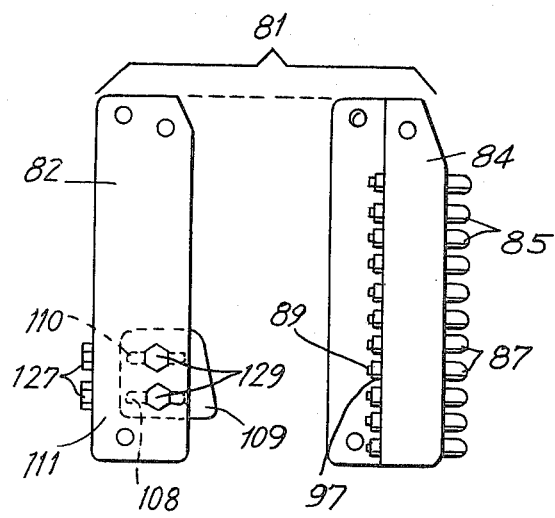
FIG. 4 is an exploded view showing details of the adjustable half of the cam station according to the invention taken from the front of FIG. 3.

Referring to FIGS. 4 and 5, the pressure cam station 49 consists of an adjustable half 81 on one side of the outer portion 39 of the assembly wheel 31 shown in FIG. 4 in exploded view and a fixed half 83 shown in FIG. 5 opposite the adjustable half 81 and on the other side of the outer portion 39 of the wheel 31. As indicated previously, FIG. 5 is a view of the underside of fixed half 83 of cam station 49 as seen in FIG. 3. Consequently, the direction of spring loaded positioners 85 shown in FIG. 5 is the reverse of the direction of these positions shown in FIG. 3. Each half 81, 83 has a plurality of spring loaded positioners 85 therein mounted in the same manner which are positioned for contact with the ball halves 22, 23.

Referring to FIG. 5, each positioner 85 consists of a plunger 87 having a rod 89 fixed thereto. A plurality of bores 91 are drilled partly through each half 81, 83 and a smaller hole 93 is drilled coaxially at the bottom of each bore 91. The smaller holes 93 extend the spaces left by the bores 91 all the way through each half 81, 83. A spring 95 is placed within each bore 91 and the plungers 87 are placed in each bore 91 so that the rods 89 extend through the spring and through the smaller holes 93. Each rod 89 has a collar 97 pressed on to it on the side of the half 81 or 83 which is opposite bore 91, thus, retaining the plunger 87 biased by the springs 95 within the bores 91.

A fixed pressure cam 99 is inserted into one end 101 of the fixed half 83 on that side 103 of the fixed half 83 from which the bores 91 are drilled. The fixed pressure cam 99 has a planar curved surface 105 which extends from the fixed half 83 in the same direction that the plungers 87 extend therefrom.

As best seen in FIG. 4, adjustable half 81 comprises an upper section 82 and a lower section 84 which are assembled together when they are mounted at the pressure cam station 49. An adjustable pressure cam 109 provided with a pair of slots 108 and 110 shown in dotted line is mounted between section 82 and 84 at one end 111 of adjustable half 81. A pair of lateral adjustable bolts 129 are provided which pass through bores drilled in upper section 82 and which ride in slots 108 and 110. A pair of pressure adjustment bolts 127 are also provided which engage the outside lateral margin of adjustable pressure cam 109 and is adapted to urge the latter inwardly toward the path taken by the ball halves.

The two halves 81, 83 are positioned on opposite sides of the outer portions 39 of the assembly wheel 31 with the positioners 85 facing towards one another. The positioners 85 will then exert a biasing force pressing successive pairs of male and female ball halves 22, 23 toward one another after the ball halves 22, 23 are over the applicator disc 53. This assures that the intersecting surfaces of the ball halves 78, 79 fully contact the applicator disc 53. The pressure cam station 49 extends beyond the applicator disc 53 so that after each pair of ball halves 22, 23 have left the applicator station 47, the pairs of ball halves 22, 23 are forced to contact each other. The ends 101, 111 of the halves 81, 83 are located beyond the solvent applicator station so that as the pairs of ball halves 22, 23 pass the pressure cams 99, 109 the pairs of ball halves 22, 23 are contacting one another. The pressure cams 99, 109 press the successive pairs of ball halves 22, 23 into a firm engaging relationship with one another thereby forming completed balls 121. The successive balls 121 are then guided by the slots 36, 37 to a discharge station 123 where the balls 121 drop into a discharge chute 124 for further processing at the grinding stations 13.

Thus, it can be seen that if the ball halves 22, 23 are made of polystyrene plastic, the ball assembly machine 1 first receives the ball halves 22, 23 then applies a solvent bonding material such as methylene chloride to the intersecting surfaces 78, 79 of the ball halves 22, 23. The ball halves 22, 23 are then pressed together in order to form complete balls 121.

The ball halves 22, 23 may be made of polypropylene and adapted to snap together without the need for a solvent bonding material. In this case, the solvent applicator station 47 performs no useful function and may be removed from the machine or allowed to operate without solvent. Furthermore, the pressure cams 99, 109 are not used to effect a solvent bond but are instead used to press fit the ball halves 22, 23 together, thereby also forming complete balls 121. It can thus be seen that the ball assembly machine 1 of this invention is readily adaptable for use in the assembly of balls from halves either by pressure fitting or by solvent bonding.

The pressure provided by the cams 99, 109 must be precisely adjusted in order that the pressure effects complete assembly of the balls 21 but does not unnecessarily deform the balls 121, regardless of the materials or method of assembly used. Therefore, the adjustable pressure cam 109 is placed in precise alignment in the adjustable half 81 by means of pressure adjustment bolts 127 and lateral adjustment bolts 129. The pressure adjustment bolts 127 are received by threaded bores (not shown) extending through the adjustable half from a side opposite surface 113 in the direction of surface 113 and communicating with the adjustable pressure cam 109. The lateral adjustment bolts are received by threaded bores (not shown) extending radially inward toward the center axis 33 and communicating with the adjustable pressure cam 109. The lateral adjustment bolts 129 serve to prevent lateral movement of the adjustable pressure cam 109 when the lateral adjustment bolts 129 are secured against the pressure cam 109.

The above description is to a preferred embodiment of the invention for the purpose of illustrating the invention concepts and should not be considered to limit the scope of the invention. For example, the pressure cams are readily adapted for thermal bonding methods such as ultrasonic bonding.

What is claimed is:

1. An apparatus for assembling hollow balls from pre-formed ball halves which are provided for the apparatus comprising:
   (a) entrance means for receiving the ball halves;
   (b) a wheel having a plurality of ball half receiving slots on the outer portion thereof;
   (c) drive means causing the wheel to rotate;
   (d) pressure positioning and application means located adjacent the outer portion of the wheel for forcing the ball halves together; said pressure positioning and application means being stationary with respect to the rotational motion of said wheel and positioned so as to be astride said ball halves as they proceed on their rotational motion on said wheel; said pressure positioning means comprising a plurality of pressure biased positioning members adopted to apply light pressure against ball halves as they pass between said positioning members so as to urge the ball halves together for the purpose of positioning them to be forced together; said pressure application means being positioned and adopted to apply sufficient pressure to the ball halves to force them together after they have been positioned by said positioning members;
   (e) discharge means communicating with the slots; and
   (f) the drive means turning the wheel so that the slots first receive the ball halves from the entrance means, the slots then guide the ball halves past the pressure positioning and application means and the slots then guide the balls to the discharge means, whereby ball halves are pressed together to form whole balls at the pressure application means.

2. An apparatus for assembling hollow balls from preformed ball halves which are provided for the apparatus comprising:
   (a) entrance means for receiving the ball halves;
   (b) a wheel having a plurality of ball half receiving slots on the outer portion thereof; said wheel comprising a pair of spaced discs to provide a space therebetween separating the ball half receiving slots, said space permitting the insertion of a solvent or other adhesive applicator between the ball halves as they are guided in the slots for the purpose of applying solvent or other adhesive to the ball halves;
   (c) drive means causing the wheel to rotate;
   (d) pressure application means located adjacent the outer portion of the wheel for forcing the ball halves together;
   (e) discharge means communicating with the slots;
   (f) said drive means turning the wheel so that the slots first receive the ball halves from the entrance means, the slots then guide the ball halves past the pressure application means and the slots then guide the balls to the discharge means, whereby ball halves are pressed together to form whole balls at the pressure application means;
   (g) a rotatable applicator disc positioned to make contact with said ball halves in order to apply solvent or adhesive thereto prior to pressing them together to form the whole balls; and
   (h) a solvent or adhesive receptacle;
   said rotatable disc being partially immersed in said solvent or adhesive receptacle.

3. The apparatus of claim 1 wherein the wheel turns about and is driven along a horizontal axis.

4. The apparatus of claim 1 wherein said applicator may be selectively used when the ball halves are to be solvent or adhesively bonded together to form whole balls.

5. The apparatus of claim 1 wherein the pressure application means comprises a means for lightly forcing the ball halves together for the purpose of positioning the ball halves and a means for strongly forcing the ball halves together in order to form whole balls.

6. The apparatus of claim 5 wherein the means for lightly forcing the ball halves together are resiliently biased by biasing means and the means for strongly forcing the ball halves together are rigid cams.

7. The apparatus of claim 6 further comprising adjustable positioning means for adjusting the position of the cams in relation to one another.

8. The apparatus of claim 4 wherein adjustment means are provided for the pressure application means so that the amount of force applied by the pressure application means may be manually varied according to whether or not the solvent or adhesive applicator is used.

9. An apparatus according to claim 1 wherein the wheel turns about and is driven along a horizontal axis.

10. An apparatus according to claim 1 in which said pressure application means comprises a pair of rigid cams positioned astride the path taken by the ball halves in their rotational motion.

11. An apparatus according to claim 10 including adjustable positioning means for adjusting the position of the cams in relation to one another.

* * * * *